(12) United States Patent
Fujita et al.

(10) Patent No.: US 7,528,565 B2
(45) Date of Patent: May 5, 2009

(54) SIGNAL PROCESSING DEVICE, SIGNAL PROCESSING METHOD, SIGNAL PROCESSING PROGRAM, RECORDING MEDIUM STORING THE PROGRAM, SPEED DETECTOR AND SERVOMECHANISM

(75) Inventors: Jun Fujita, Mishima (JP); Takamichi Ito, Numazu (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 481 days.

(21) Appl. No.: 11/312,529

(22) Filed: Dec. 21, 2005

(65) Prior Publication Data
US 2006/0145648 A1    Jul. 6, 2006

(30) Foreign Application Priority Data
Dec. 22, 2004 (JP) ............................. 2004-371725
May 27, 2005 (JP) ............................. 2005-155918

(51) Int. Cl.
*G05B 11/01* (2006.01)
(52) U.S. Cl. ................... 318/560; 318/608; 318/609
(58) Field of Classification Search ................... None
See application file for complete search history.

(56) References Cited

U.S. PATENT DOCUMENTS

| 5,313,147 | A  | * | 5/1994 | Yoneda et al. | ............ | 318/569 |
| 5,428,285 | A  | * | 6/1995 | Koyama et al. | ............ | 318/799 |
| 7,038,421 | B2 |   | 5/2006 | Trifilo | ............ | 318/625 |
| 7,075,262 | B2 | * | 7/2006 | Igarashi | ............ | 318/560 |
| 7,183,739 | B2 | * | 2/2007 | Iwashita et al. | ............ | 318/625 |
| 2001/0002097 | A1 | * | 5/2001 | Tsutsui | ............ | 318/560 |
| 2003/0205982 | A1 | * | 11/2003 | Tanaka et al. | ............ | 318/560 |

FOREIGN PATENT DOCUMENTS

| CN | 1158675 | 9/1997 |
| JP | 05-256638 | 10/1993 |
| JP | H06-197588 | 7/1994 |

(Continued)

OTHER PUBLICATIONS

Office Action issued in related Chinese Application 2005-10133871.1 on Apr. 4, 2008.

(Continued)

*Primary Examiner*—Walter Benson
*Assistant Examiner*—Renata McCloud
(74) *Attorney, Agent, or Firm*—DLA Piper LLP US

(57) ABSTRACT

A signal processing device processes a position information signal (A sin$\theta$, A cos$\theta$) output from a sensor in accordance with a driving position of a motor and detects a driving speed of the motor. The signal processing device includes a position information signal processor (410) that processes the position information signal and calculates driving speed information of the motor, and an internal position information generator (460) that reflects a latest driving speed information ($\omega_n$) calculated by the position information signal processor (410) and generates a latest presumed position of the motor as internal position information. The position information signal processor (410) calculates driving speed information ($\omega_n$) of the motor based on a difference between the position information signal (A sin$\theta$, A cos$\theta$) from the sensor and the internal position information (A sin$\theta_n$, A cos$\theta_n$) generated by the internal position information generator (460).

6 Claims, 12 Drawing Sheets

FOREIGN PATENT DOCUMENTS

| | | |
|---|---|---|
| JP | 2000-055695 | 2/2000 |
| JP | 2000-078809 A | 3/2000 |
| JP | 2000-092805 A | 3/2000 |
| JP | 2000-350489 | 12/2000 |
| JP | 2001-126303 | 5/2001 |
| JP | 2001-204190 | 7/2001 |
| JP | 2004-5218 | 8/2004 |

OTHER PUBLICATIONS

English Translation of Office Action issued in related Chinese Application 2005-1013387.1 on Apr. 4, 2008.

English Language abstract of JP 06-197588.
English Language abstract of CN1158675.
English Language Translation of JP2000-092805 A.
English Language Translation of JP2000-078809 A.
English Language Translation of JP2000-055695.
English Language Translation of JP2001-204190.
English Language Translation of JP-2001-126303.
English Language Translation of JP-2000-350489.
English Language Translation of JP-05-256638.
English Language Translation of JP-2004-5218.
English Language Translation of JP-H06-197588.

* cited by examiner

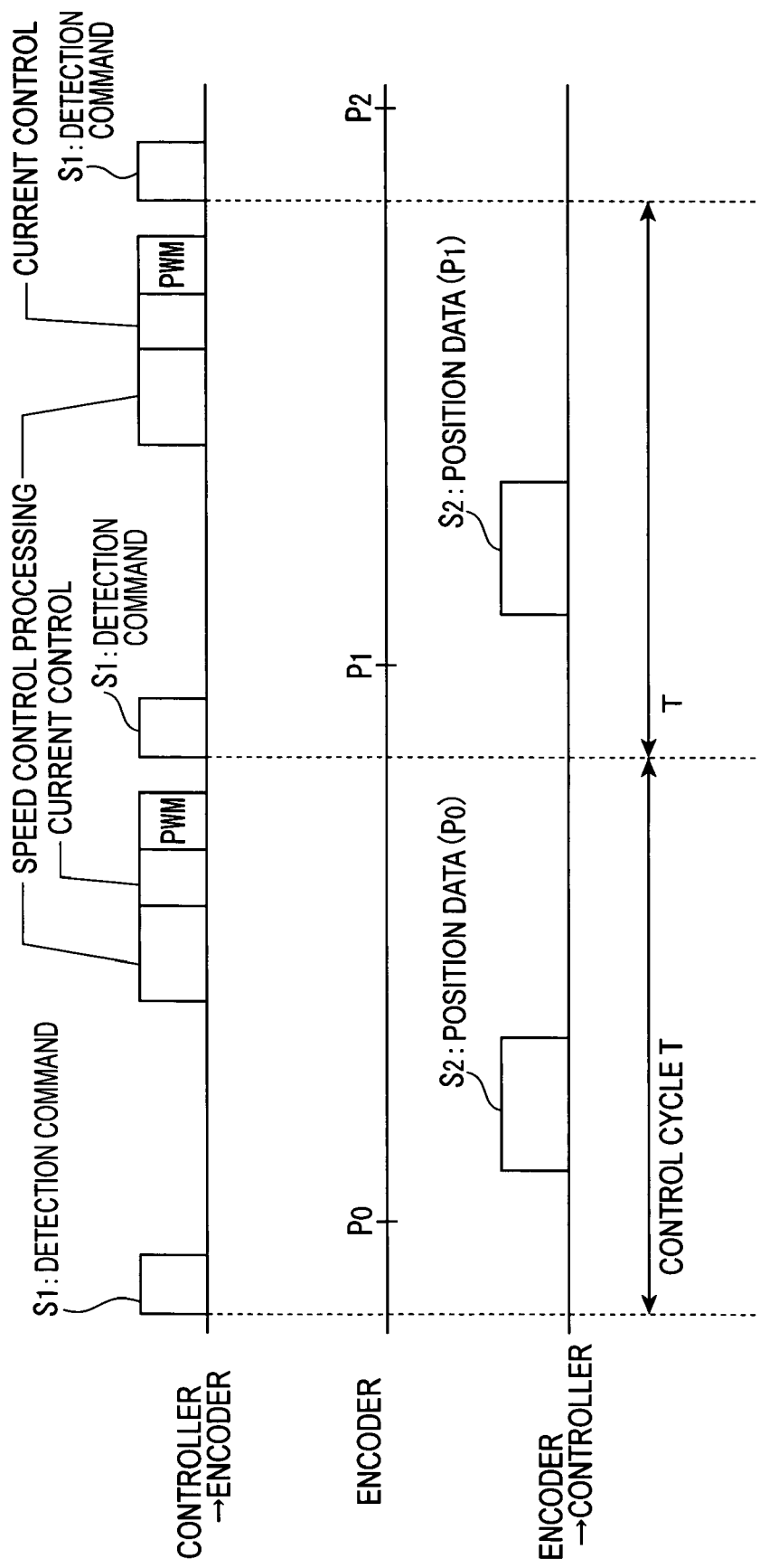

SIGNAL PROCESSING DEVICE, SIGNAL PROCESSING METHOD, SIGNAL PROCESSING PROGRAM, RECORDING MEDIUM STORING THE PROGRAM, SPEED DETECTOR AND SERVOMECHANISM

BACKGROUND OF THE INVENTION

1. Field of the Invention

The present invention relates to a signal processing device, in particular, the present invention relates to a signal processing device, a signal processing method, a signal processing program, a recording medium and a speed detector, each processing a two-phase signal from an encoder that detects a rotation angle of a motor and detecting a driving speed (a rotation angular speed) of the motor, as well as to a servomechanism controlling the driving speed of the motor.

2. Description of Related Art

There has been known a servomechanism that controls a driving speed (for instance, a rotation speed) of a motor (e.g. Document 1: JP-A-2004-5218).

As shown in FIG. 12, a conventional servomechanism 1 includes a motor 11 (an object to be controlled), an encoder 12 that detects a rotation position (a rotation angle) of the motor 11 and outputs a position data, and a controller 13 that calculates a motor rotation speed based on the position data from the encoder 12 and controls current to be applied to the motor 11 to achieve a target speed.

The encoder 12 detects the rotation position (the rotation angle) of the motor 11, latches the detected value and outputs information on the rotation position of the motor 11 using an absolute code. The encoder 12 connects to the controller 13 via a serial communication line 14.

FIG. 13 shows a timing chart of rotation speed control by the motor 11 in the servomechanism having the above-described configuration.

First, the controller 13 sends a command $S_1$ for detecting the position to the encoder 12 via the serial communication line 14. Upon receiving the detection command $S_1$, the encoder 12 detects the rotation position of the motor 11 (denoted as $P_0, P_1, P_2$ in FIG. 13), latches the detected value, and outputs the position data of the motor 11 to the controller 13.

When receiving the rotation position data of the motor 11 from the encoder 12, the controller 13 controls the speed of the motor 11 based on the motor rotation position. To be more specific, the controller 13 compares the motor rotation position currently received with the motor rotation position received one-cycle before, calculates the rotation speed of the motor 11, and compares the calculated motor rotation speed with the target speed. Then, the controller 13 calculates a duty ratio of electric current to be applied to the motor 11 corresponding to a difference between the motor speed and the target speed, and controls the speed of the motor 11 using the calculated duty ratio.

The above control cycles are repeated, so that the rotation speed of the motor 11 achieves the target speed.

However, if the speed control is based on such motor speed calculated from the difference between the two pieces of motor rotation position data detected according to predetermined sampling cycles, the obtained speed data is a mean speed data of the speed at the current control cycle and the speed at one-cycle before. In other words, the speed control may have time-lag (time-delay) of ½ of a sampling cycle T. The time-lag causes phase-delay of the control system, thus destabilizing the control.

SUMMARY OF THE INVENTION

An object of the present invention is to provide a signal processing device, a signal processing method, a signal processing program and a speed detector, each obtaining a driving speed of an object to be controlled promptly based on a signal from an encoder, as well as a servomechanism that stably controls the driving speed of the motor.

A signal processing device according to an aspect of the invention for processing a position information signal output from a sensor in accordance with a driving position of a driver and detecting a driving speed of the driver, includes: a position information signal processor that processes the position information signal and calculates driving speed information of the driver; and an internal position information generator that reflects a latest driving speed information calculated by the position information signal processor and generates a latest presumed position of the driver as internal position information, in which the position information signal processor calculates the driving speed information of the driver based on a difference between the position information signal from the sensor and the internal position information generated by the internal position information generator.

With this configuration, the internal position information generator generates the position information of the driver as the internal position information with the latest driving speed information of the driver being reflected, and when the position information signal of the driver is input from the sensor, the position information signal processor instantly calculates the difference between the position information signal of the sensor and the internal position information. The driving speed of the driver is calculated based on the difference and output. The driving speed is output to, for instance, a controller provided outside as the driving speed information of the driver, and at the same time, is input to the internal position information generator for presuming a latest position of the driver.

Here, the internal position information generator constantly generates the position information of the driver with the latest driving speed information being reflected, thereby obtaining the position information of the driver as the latest as presumable. Accordingly, the time-gap ($\Delta t$) existing between the internal position information generated by the internal position information generator and the position information signal input from the sensor can be decreased. For instance, if the time-gap is regarded as an extremely small amount of time ($\Delta t \to 0$), the difference between the position information signal from the sensor and the internal position information generated by the internal position information generator becomes a derivative value of the position information signal from the sensor, which can directly be the driving speed of the driver.

Since the internal position information generator generates the presumed position of the driver as the internal position information, when the position information signal is input from the sensor, the difference between the both is instantly calculated, thereby obtaining the driving speed of the driver. The obtained driving speed information is substantially equal to the driving speed information obtained by instantly differentiating the position information signal input from the sensor, therefore obtaining the speed information without the time-lag relative to the input position information.

Conventionally, since position data according to a predetermined sampling cycle is used for calculating the difference between the position of the driver in the current control cycle and that in the one-cycle before, the obtained data is merely a mean speed data with a ½ cycle lag. However, in the aspect of the present invention, the driving speed at the point of the input sampling signal (the position information signal) can be obtained, so that the time-lag becomes extremely small, thereby attaining significant effect of remarkable recovering the time-lag in the conventional ways.

For instance, in the case where the driver is controlled by applying the driving speed information obtained by the signal processing device as a feedback signal, the control system can remarkably stably be controlled since there is no phase-delay.

Preferably, in the above-described signal processing device, the internal position information generator may generate the internal position information based on an integration value obtained by sequentially integrating the driving speed information output from the position information signal processor.

With this configuration, since the position information signal processor constantly outputs the driving speed of the driver, the position information of the driver can be obtained based on the speed information in which the driving speed is sequentially integrated by the internal position information generator. Further, the integration of even the latest driving speed information provides the internal position information presuming the position of the driver with the driving amount of the driver between the previous input position information signal and the subsequent timing taken into calculation.

As described above, since the internal position information generator generates the presumed position of the driver as the internal position information, when the position information signal is input from the sensor, the difference between the both is instantly calculated to obtain the driving speed of the driver.

Preferably, in the above-described signal processing device, the position information signal processor may include: a difference calculator that calculates the difference between the position information signal from the sensor and the internal position information generated by the internal position information generator; and a driving speed calculator that calculates driving speed information of the driver based on the difference from the difference calculator.

For example, the driving speed calculator multiplies the difference calculated with the difference calculator by a predetermined gain to calculate the driving speed information.

With this configuration, for instance, the calculated difference between the position information signal and the internal position information by the difference calculator is multiplied by an appropriate gain to calculate the driving speed information corresponding to the characteristic of the driver.

For example, when a sine wave signal periodically changing in accordance with the driving position of the driver is input from the sensor, the position information signal is a trigonometric function value applying a phase as a parameter. In a case where a phase changing amount is necessary as the driving speed information, the driving speed calculator converts the trigonometric function value into the phase changing amount to obtain the phase changing amount as the driving speed information.

Preferably, in the above-described signal processing device, the position information signal output from the sensor may be a periodic function signal periodically changing in accordance with drive of the driver, the position information signal processor may output phase changing amount of the periodic function signal as driving speed information of the driver, and the internal position information generator may include: an integrator that integrates the phase changing amount from the position information signal processor and calculates a phase corresponding to position information of the driver; and an internal position information converter that calculates a periodic function value corresponding to the phase calculated by the integrator as the internal position information.

With this configuration, a phase changing amount is calculated as the driving speed information corresponding to the position information signal of the periodic function input from the sensor. Then, the phase is calculated by integrating the driving speed information which is the phase changing amount, and the periodic function value corresponding to the phase is calculated as the internal position information.

Since the periodic function value is input, a function value is necessary to be held as the internal position information in order to obtain the difference between the input position information signal and the internal position information, and therefore, the internal position information converter calculates the function value based on the phase calculated by the integrator. Hence, the difference between the input position information signal and the internal position information is instantly calculated, thereby obtaining the speed information without the time-lag relative to the input position information.

Further, provision of the internal position information converter that calculates the function value applying the phase as the parameter allows the position information signal input from the sensor to be merely the sine wave signal or the like, and need not be the phase information itself. Accordingly, an encoder (a photoelectric encoder, a capacitance encoder, a magnetic encoder etc.), which is typically used as a sensor, can directly be used as the sensor, and therefore, there is no need of special design change just for the signal processing device of the aspect of the present invention, and cost increase can be avoided.

Preferably, in the above-described signal processing device, the periodic function signal may be a two-phase signal containing a first signal and a second signal having a predetermined phase difference, the position information signal processor may include: a first signal processor that processes the first signal and outputs a phase changing amount of the first signal as the driving speed information; and a second signal processor that processes the second signal and outputs a phase changing amount of the second signal as the driving speed information, and a signal switching section may be provided on a downstream side of the position information signal processor, the signal switching section selecting and switching to the output signal based on the periodic function signal with the signal value changing amount of the periodic function signal being greater than the phase changing amount of either the output signal from the first signal processor or the output signal from the second signal processor.

With this configuration, since the signal switching section selects the phase changing amount (the driving speed information) calculated based on the signal having the signal value change being greater than the phase changing amount, contained in the two-phase signal, the phase changing amount can accurately be obtained as the driving speed information.

Since the position information signal output from the sensor is the periodic function, there is a region where the changing rate of the function value is small relative to the phase change, so that the phase change may not be obtained accurately even when the internal position information is subtracted from the periodic function value. However, if the signal (the first signal or the second signal) having the signal changing amount being greater relative to the phase change is applied, the phase changing amount can accurately be obtained in the entire region.

For example, when the periodic function signal is a trigonometric function signal with a phase difference of 90°, the first signal may be a sine wave signal (A sin θ) while the second signal is a cosine wave (A cos θ), or the first signal may be tan θ while the second signal is 1/tan θ.

Further, even when the two-phase signal output from the sensor is the sine wave signal (A sin θ) and the cosine wave signal (A cos θ), the driving speed of the driver can be detected with the signal processing based on a two-phase signal converted into tan θ(=A sin θ/A cos θ) and 1/tan θ(=A cos θ/A sin θ). By applying a ratio of the two signals, an input signal unaffected by the fluctuation of the amplitude of the signal can be obtained.

Preferably, in the above-described signal processing device, the periodic function signal may be a sine wave signal, and the signal switching section may include: a determiner that compares the first signal or the second signal with a predetermined threshold and determines whether the signal is greater than the predetermined threshold; and a switcher that may switch between the output signal from the first signal processor and the output signal from the second signal processor according to the determination result of the determiner.

For instance, when the absolute value of one of the signal values is smaller than the threshold, the one of the signal values may be used, and when the absolute value of one of the signal values is greater than the threshold, the other one of the signal values may be used.

With this configuration, while the large absolute value of the sine wave signal causes the small changing rate relative to the phase, the signal having the changing rate being greater relative to the phase is selected by the determination compared with the predetermined threshold. Accordingly, the phase changing amount can accurately be obtained in the entire region. Additionally, the determination for determining the greater signal changing amount relative to the phase change does not require complicated arithmetical processing, but only requires the simple comparison between one of the signal values with the threshold.

Preferably, the above-described signal processing device may further include a sign converter that converts a sign of the phase changing amount output from the position information signal processor into a sign indicating increase/decrease in a moving direction of the driver.

In a case where the position information signal from the sensor is a periodic function which increases/decreases periodically, even if the driver is displaced in a plus direction and the phase increases, there may be a region where the signal value of the position information signal decreases. If such decreasing signal value is simply subtracted by the internal position information, the phase changing amount may be minus even though the driver is displaced in the plus direction and the phase increases. On the other hand, since the sign converter is provided in the aspect of the present invention, even if the phase changing amount is calculated as minus when the driver is displaced in the plus direction, the sign of the phase changing amount is converted in an increasing/decreasing direction corresponding to the moving direction of the driver to obtain the driving speed (the phase changing amount) with the correct increasing/decreasing direction, and also the internal position information is generated based on the driving speed (the phase changing amount) with the correct increasing/decreasing direction.

The encoder as the sensor typically outputs the sine wave signal periodically changing as a sensor output, but the signal processing device of the aspect of the present invention can appropriately processes the sensor signal from the typical sensor to obtain the driving speed of the object to be controlled by the provision of the sign converter, and therefore, there is no need of special design change just for the signal processing device of the aspect of the present invention, and cost increase can be avoided.

Preferably, in the above-described signal processing device, the internal position information generator may include: a first integrator that integrates the phase changing amount of the first signal output from the first signal processor and calculates a phase corresponding to position information of the driver; a first internal position information converter that calculates a function value of the first signal based on the phase calculated by the first integrator; a second integrator that integrates the phase changing amount of the second signal output from the second signal processor and calculates a phase corresponding to position information of the driver; and a second internal position information converter that calculates a function value of the second signal based on the phase calculated by the second integrator.

With this configuration, the sensor outputs the first signal and the second signal as the two-phase signal, the first signal processor processing the first signal and outputting the phase changing amount of the first signal, and the second signal processor processing the second signal and outputting the phase changing amount of the second signal. The first integrator sequentially integrates the phase changing amount of the first signal output from the first signal processor, and calculates a latest phase of the first signal. The phase calculated by the first integrator is input to the first internal position information converter, so that the first internal position information converter calculates a function value of the first signal as a latest presumed position of the driver. The first signal processor calculates the difference between the function value of the first signal calculated by the first internal position information converter and the first signal input from the sensor, so that the driving speed of the driver is calculated based on the difference.

The second integrator sequentially integrates the phase changing amount of the second signal output from the second signal processor, and calculates a latest phase of the second signal. The phase calculated by the second integrator is input to the second internal position information converter, so that the second internal position information converter calculates a function value of the second signal as a latest presumed position of the driver. The second signal processor calculates the difference between the function value of the second signal calculated by the second internal position information converter and the second signal input from the sensor, so that the driving speed of the driver is calculated based on the difference.

And, the output signal selected by the signal switching section from the output signal of the first signal processor and the output signal of the second signal processor is output as the driving speed of the driver.

With this configuration, since the sensor outputs the two-phase signal containing the first signal and the second signal, the first integrator and the first internal position information converter are provided for the first signal processor processing the first signal, and the second integrator and the second internal position information converter are provided for the second signal processor processing the second signal. Accordingly, the driving speed of the driver based on the first signal can be calculated with arithmetic processing merely based on the first signal in the loop of the first integrator and the first internal position information converter applying the phase changing amount based on the first signal as the feedback information Similarly, the driving speed of the driver based on the second signal can be calculated with arithmetic processing merely based on the second signal in the loop of the second integrator and the second internal position information converter applying the phase changing amount based on the second signal as the feedback information Then, even when the amplitude of the first signal is different from that of the second signal, the speed information respectively from the position information processors (the first signal processor and the second signal processor) will not be influenced by the difference between the respective amplitudes of the first and second signals. Consequently, the influence of the difference between the respective amplitudes of the first and second signals are restricted. Thereby, the output driving speed information is continually provided even when the signal switching section switches between the driving speed information from the first signal processor and that from the second signal processor.

Preferably, in the above-described signal processing device, the driver may be a motor having a rotator, and the position information signal output from the sensor may be a periodic function signal periodically changing in accordance with rotation of the motor, the position information signal processor may output a rotation angular speed as driving speed information of the motor, the integrator may integrate the rotation angular speed from the position information signal processor and calculate a rotation phase angle of the motor, and the internal position information converter may calculate a periodic function value based on the rotation phase angle of the motor.

With this configuration, the rotation angular speed can be obtained as the driving speed of the motor based on the periodic function signal output from the sensor in accordance with the rotation of the motor.

A signal processing method according to another aspect of the invention for processing a position information signal output from a sensor in accordance with a driving position of a driver and detecting a driving speed of the driver, includes the steps of: a position information signal processing step that processes the position information signal and calculates driving speed information of the driver; and an internal position information generating step that reflects a latest driving speed information calculated in the position information signal processing step and generates a latest presumed position of the driver as internal position information, in which the position information signal processing step calculates the driving speed information of the driver based on a difference between the position information signal from the sensor and the internal position information generated in the internal position information generating step.

With this configuration, the same advantages as the above-described aspect of the present invention can be attained.

A signal processing program according to still another aspect of the invention is executable by a computing unit included in a signal processing device for processing a position information signal output from a sensor in accordance with a driving position of a driver and detecting a driving speed of the driver. The program allows the computing unit to function as a position information signal processor that processes the position information signal and calculates driving speed information of the driver, and an internal position information generator that reflects a latest driving speed information calculated by the position information signal processor and generates a latest presumed position of the driver as internal position information, and the position information signal processor calculates the driving speed information of the driver based on a difference between the position information signal from the sensor and the internal position information generated by the internal position information generator.

A recording medium according to yet another aspect of the invention stores the above-described signal processing program.

If such signal processing program is installed in the computing unit and the computing unit is operated as the respective functional parts, for instance, various parameters can easily be changed.

Incidentally, the signal processing program may be installed by inserting a memory card, a CD-ROM or the like to the signal processing device, or by connecting equipment for reading the recording medium to the signal processing device. Otherwise, the signal processing program may be installed by connecting a telephone line or the like to the signal processing device and acquiring the program via communication, or by acquiring the program wirelessly.

A speed detector according to a further aspect of the invention includes a sensor that outputs a position information signal in accordance with a driving position of a driver; and the above-described signal processing device.

With this configuration, there can be provided the speed detector in which the signal processing device processes the position information signal from the sensor to obtain the driving speed of the driver promptly.

A servomechanism according to a still further aspect of the invention includes: a driver; a sensor that outputs a position information signal in accordance with a driving position of a driver; the above-described signal processing device; and a central processing unit that compares the driving speed of the driver detected by the signal processing device with a predetermined target speed given from the outside and controls the driving speed of the driver to achieve the predetermined target speed.

With this configuration, the central processing unit can control the driver applying the driving speed information obtained by the signal processing device as the feedback signal. Consequently, the control system can remarkably stably be controlled since there is no phase-delay.

BRIEF DESCRIPTION OF THE DRAWINGS

FIG. 13 is a timing chart of rotation speed control of a motor in the conventional servomechanism.

DETAILED DESCRIPTION OF PREFERRED EMBODIMENT(S)

Figure 1:
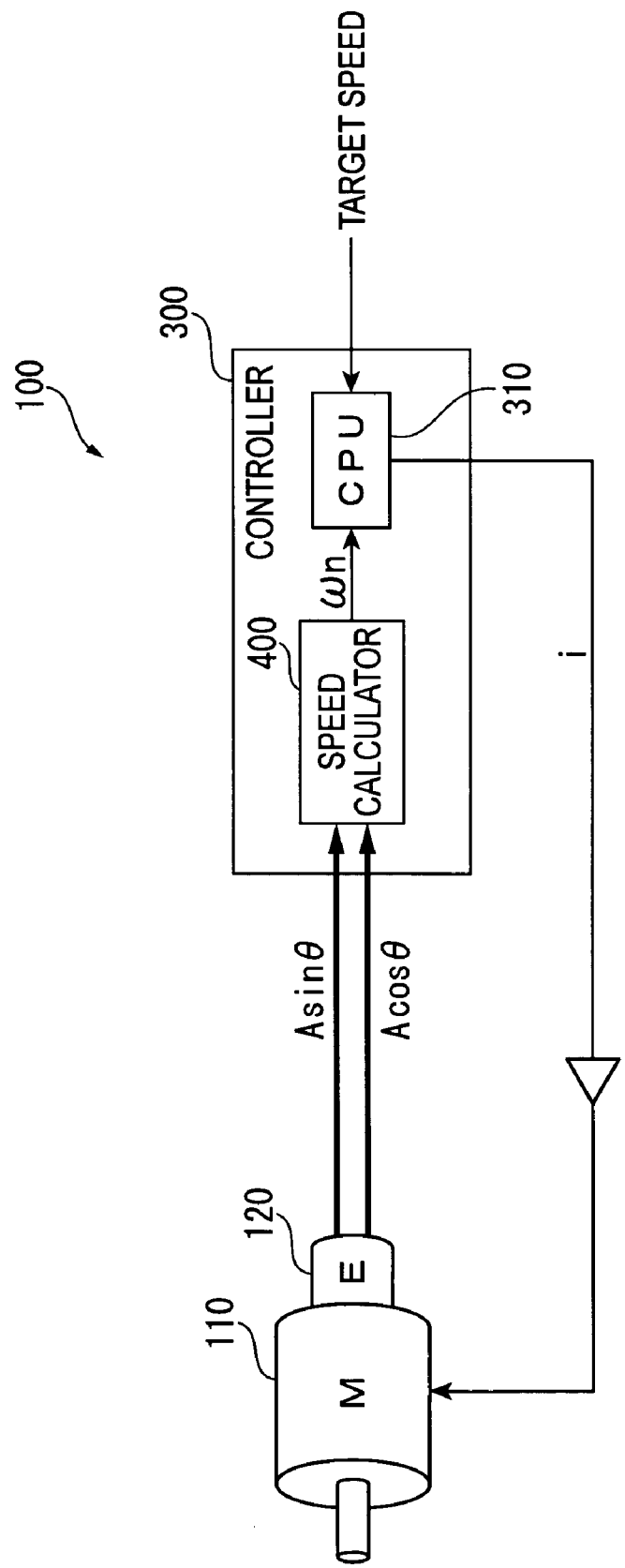
FIG. 1 is a block diagram of a first embodiment according to a servomechanism of the present invention.

Embodiments of the present invention will be illustrated and described with reference to reference characters given to respective elements in the drawings.

First Embodiment

A first embodiment of a servomechanism of the present invention will be described below.

FIG. 1 is a block diagram of the servomechanism.

A servomechanism 100 includes a motor (driver) 110 as an object to be controlled, an encoder 120 as a sensor that outputs a position information signals (a periodic function signal) of both a sine wave (A sin θ) and a cosine wave (A cos θ) in accordance with rotation of the motor 110, and a controller 300 that calculates a motor rotation speed (driving speed information) based on the position information signal from the encoder 120 and controls the motor rotation speed to achieve a target speed input from the outside.

Figure 2:
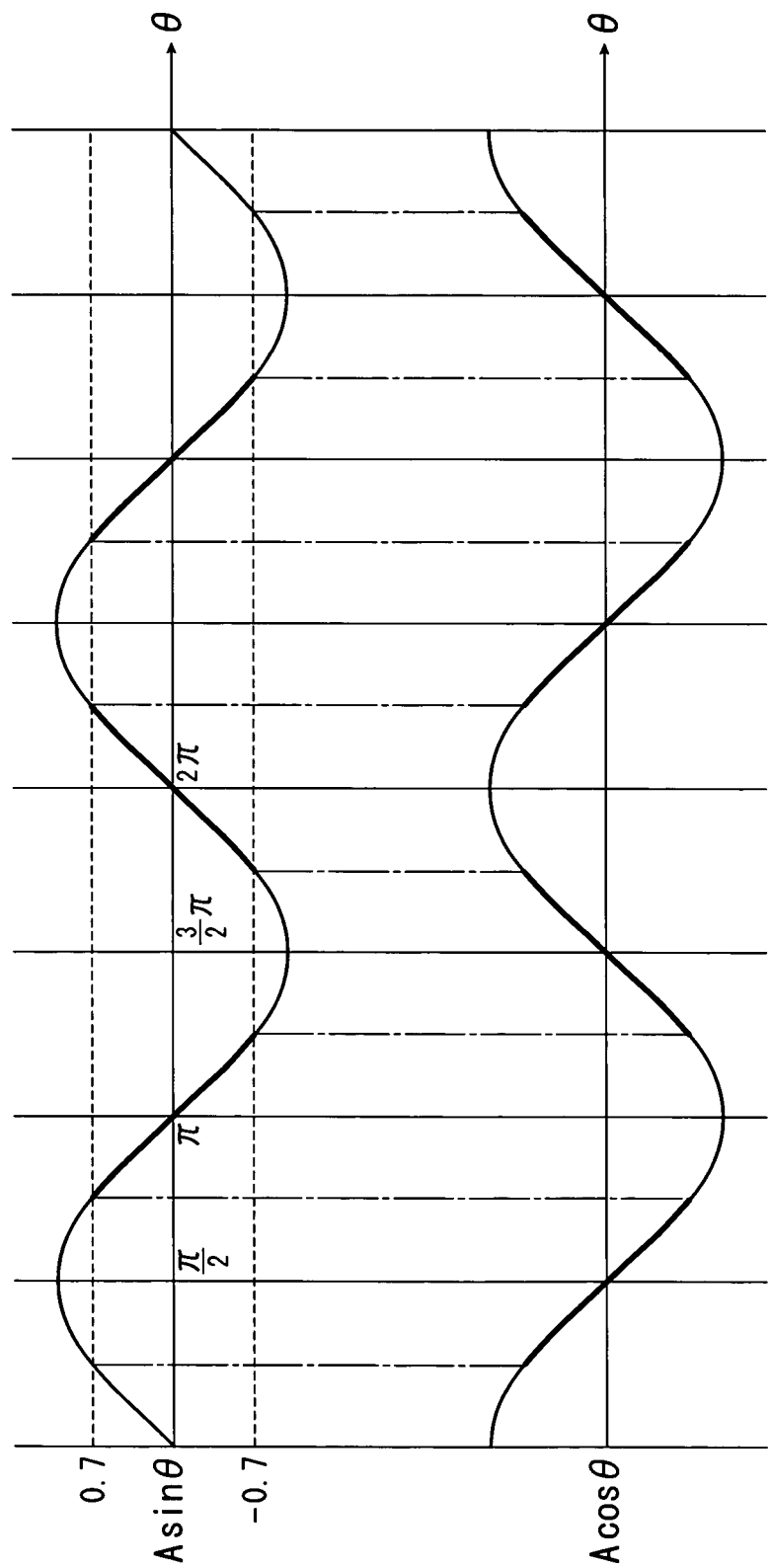
FIG. 2 is an illustration of a two-phase signal output from an encoder in the first embodiment.

Though not described in detail, the encoder 120 is the known rotary encoder 120, which has a rotor integrally rotating with a rotator of the motor 110 and outputs the position information signal (A sin θ, A cos θ), i.e., a periodic function periodically changing in accordance with the rotation of the rotor. As shown in FIG. 2, the position information signal is a two-phase signal containing a sine wave (A sin θ) and a cosine wave (A cos θ) having 90° phase difference with each other. The rotary encoder 120 may be a photoelectric encoder, a capacitance encoder, a magnetic encoder or the like.

The controller 300 includes a speed calculator 400 as a signal processing device that processes the position information signal from the encoder 120 and calculates the motor rotation speed, and a CPU 310 as a central processing unit that compares the motor rotation speed calculated by the speed calculator 400 with the target speed input from the outside and controls the motor rotation speed to achieve the target speed.

The configuration of the speed calculator 400 will be described below.

Figure 3:
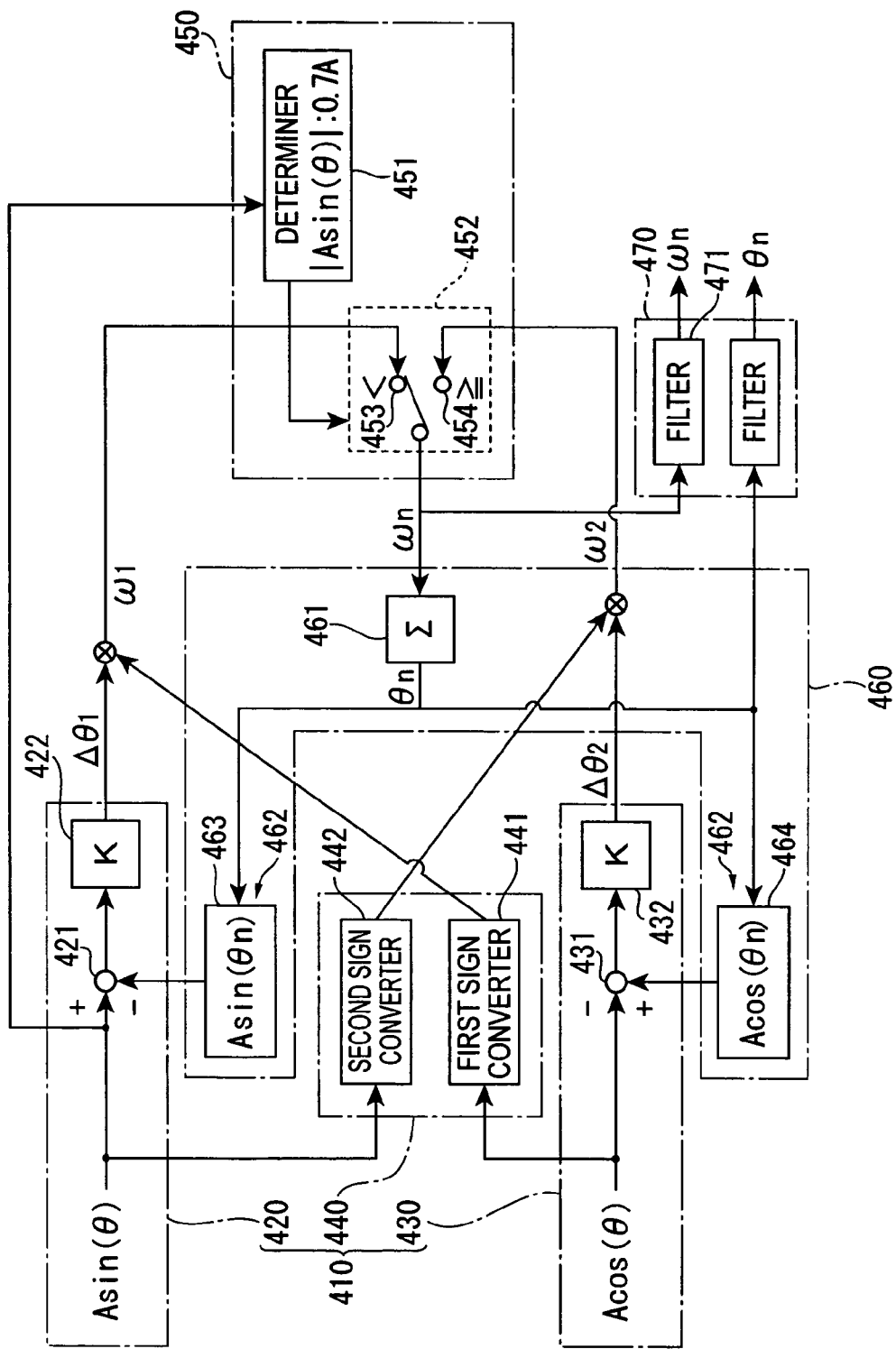
FIG. 3 is a block diagram showing the configuration of a speed calculator in the first embodiment.

FIG. 3 is a block diagram showing the configuration of the speed calculator 400.

The speed calculator 400 includes a position information signal processor 410 that processes the two-phase signal (A sin θ, A cos θ) output from the encoder 120 and calculates the motor rotation speed ($\omega_n$), a signal switching section 450 that selects the motor rotation speed information based on either one of the two-phase signal by comparing with a predetermined condition, an internal position information generator 460 that generates motor driving position information ($\theta_n$) reflecting a latest motor rotation speed as internal position information based on the motor rotation speed ($\omega_n$) from the position information signal processor 410, and an output unit 470 that outputs the motor rotation speed information ($\omega_n$) and the motor driving position information ($\theta_n$) of the motor 110.

The position information signal processor 410 includes a sine signal processor (a first signal processor) 420 that processes the sine wave signal (A sin θ) contained in the two-phase signal output from the encoder 120 and calculates a rotation changing amount ($\Delta\theta_1$) of the motor 110, a cosine signal processor (a second signal processor) 430 that processes the cosine wave signal (A cos θ) contained in the two-phase signal output from the encoder 120 and calculates a rotation changing amount ($\Delta\theta_2$) of the motor 110, and a sign converter 440 that converts the rotation changing amounts ($\Delta\theta_1$, $\Delta\theta_2$) respectively from the sine signal processor 420 and the cosine signal processor 430 into rotation angular speeds ($\omega_1$, $\omega_2$ (rad/s)) of the motor 110 according to a normal rotation direction.

The sine signal processor 420 includes a first subtracter (a difference calculator) 421 that subtracts the internal position information (A sin $\theta_n$) generated by the internal position information generator 460 from the sine wave signal (A sin θ) input by the encoder 120 to output a difference signal, and a first gain multiplier (a driving speed calculator) 422 that multiplies the difference signal output from the first subtracter 421 by a predetermined gain (K) to calculate the motor rotation changing amount ($\Delta\theta_1$).

The first subtracter 421 subtracts the motor driving position information (the internal position information A sin $\theta_n$) generated by the internal position information generator 460 from the sine wave signal (A sin θ) input from the encoder 120.

The difference calculated by the first subtracter 421 is a difference of a function value (A sin θ-A sin $\theta_n$), and then, the first gain multiplier 422 multiplies the difference signal output from the first subtracter 421 by the predetermined gain (K) to output the rotation changing amount ($\Delta\theta_1$) of the motor 110.

The cosine signal processor 430 includes a second subtracter (a difference calculator) 431 that subtracts the cosine wave signal (A cos θ) input by the encoder 120 from the internal position information (A cos $\theta_n$) generated by the internal position information generator 460 to output a difference signal, and a second gain multiplier (a driving speed calculator) 432 that multiplies the difference signal output from the second subtracter 431 by the predetermined gain (K) to calculate the motor rotation changing amount ($\Delta\theta_2$).

The sign converter 440 includes a first sign converter 441 that converts the motor rotation changing amount ($\Delta\theta_1$) output from the sine signal processor 420 based on a sign of the cosine wave signal (A cos θ), and a second sign converter 442 that converts the motor rotation changing amount ($\Delta\theta_2$) output from the cosine signal processor 430 based on a sign of the sine wave signal (A sin θ).

The first sign converter 441 multiplies the motor rotation changing amount ($\Delta\theta_1$) from the first gain multiplier 422 by −1 (minus 1) when the cosine wave signal (A cos θ) is minus (a negative value), and multiplies the motor rotation changing amount ($\Delta\theta_1$) from the first gain multiplier 422 by +1 (plus 1) when the cosine wave signal (A cos θ) is plus (a positive value).

Similarly, the second sign converter 442 multiplies the motor rotation changing amount ($\Delta\theta_2$) from the second gain multiplier by −1 (minus 1) when the sine wave signal (A sin θ) is minus (a negative value), and multiplies the motor rotation changing amount ($\Delta\theta_2$) from the second gain multiplier by +1 (plus 1) when the sine wave signal (A sin θ) is plus (a positive value).

In a case where the sine wave signal (A sin θ) input from the encoder 120 repeatedly increases/decreases periodically in accordance with the rotation of the motor 110 as shown in FIG. 2, there is a region where the sine wave signal (A sin θ) decreases even when the rotation phase angle increases along with the rotation of the motor 110. Therefore, if the internal position information (A sin $θ_n$) generated by the internal position information generator 460 is simply subtracted from the input sine wave signal (A sin θ), the rotation changing amount of the motor 110 may possibly be minus although the phase increases along with the normal rotation of the motor 110. To avoid this, the first sign converter 441 converts the sign of the output signal from the first gain multiplier 422 in an increasing direction of the rotation changing amount ($Δθ_1$) of the motor 110, based on the sign of the cosine wave signal (A cos θ), i.e., the other signal contained in the two-phase signal input from the encoder 120. Accordingly, the motor rotation changing amount ($Δθ_1$) output from the first gain multiplier 422 is constantly converted in the increasing direction, so that the rotation angular speed ($ω_1$) of the motor 110 can be obtained.

Similarly, the second sign converter 442 converts the sign of the signal output from the second gain multiplier 432 in the increasing direction of the rotation changing amount ($Δθ_2$) of the motor 110, based on the sign of the sine wave signal (A sin θ), i.e., the other signal contained in the two-phase signal input from the encoder 120. Accordingly, the motor rotation changing amount ($Δθ_2$) output from the second gain multiplier 432 is constantly converted in the increasing direction, so that the rotation angular speed ($ω_2$) of the motor 110 can be obtained.

The signal switching section 450 includes a determiner 451 that compares the sine wave signal (A sin θ) input from the encoder 120 with a predetermined threshold and determines whether the sine wave signal is greater or smaller than the threshold, and a switcher 452 that switches the input to the output unit and the internal position information generator 460 to/from the output signal of the sine signal processor 420 from/to the output signal of the cosine signal processor 430.

In a case where the position information signal (A sin θ, A cos θ) input from the encoder 120 increases/decreases periodically in accordance with the rotation of the motor 110, as exemplary shown in FIG. 2, there is a region where the signal value change of the sine wave signal (A sin θ) (or the cosine wave signal (A cos θ)) is small relative to the phase changing amount, for instance, the changing amount of the signal value becomes small relative to the changing amount of the phase (θ) when the phase is around 90° (π/2) or around 270° (3π/2) as for the sine wave signal (A sin θ).

To solve this, the signal switching section 450 switches between the sine wave signal (A sin θ) and the cosine wave signal (A cos θ) to utilize the region where the change in the signal value is great relative to the phase changing amount.

The determiner 451 compares the absolute value |A sin θ| of the sine wave signal with 0.7 A as a predetermined threshold, and determines whether the value is greater or smaller than the threshold. Here, ±0.7 substantially corresponds to ±$\sqrt{2}/2$, and as for the sine wave signal, ±0.7 corresponds to 45° (π/4), 135° (3π/4), 225° (5π/4) and 315° (9π/4).

The switcher 452 includes a sine terminal 453 to which the signal from the sine signal processor 420 is input, and a cosine terminal 454 to which the signal from the cosine signal processor 430 is input, the switcher 452 being formed of a switching unit that switches the input to the internal position information generator 460 and the output unit 470 to/from the sine terminal 453 from/to the cosine terminal 454.

The signal switching section 450 selects the sine terminal 453 if |A sin θ| is smaller than 0.7 A (|A sin θ<0.7 A|), and selects the cosine terminal 454 if |A sin θ| is or greater than 0.7 A, based on the determination by the determiner 451.

Owing to this, as shown in FIG. 2, the sine wave signal (A sin θ) or the cosine wave signal (A cos θ) with the region where the signal value change is greater than that of the other signal is sequentially selected.

The internal position information generator 460 includes an integrator 461 that integrates the motor rotation angular speed ($ω_1$, $ω_2$) from the position information signal processor 410 to calculate the rotation phase ($θ_n$) of the motor 110, and an internal position information converter 462 calculates the internal position information (A sin $θ_n$, A cos $θ_n$) by converting into a trigonometric function value applying the rotation phase ($θ_n$) of the motor 110 calculated by the integrator 461 as a parameter.

The integrator 461 integrates the motor rotation angular speed ($ω_1$ or $ω_2$) which is the output signal selected by the switcher 452 to calculate the rotation phase ($θ_n$) of the motor 110. Namely, the integrator 461 calculates the motor rotation phase ($θ_n$) reflecting a latest motor rotation angular speed ($ω_1$, $ω_2$). Then, the integrator 461 outputs the calculated motor rotation phase ($θ_n$) to the internal position information converter 462.

The internal position information converter 462 includes a first internal position information converter 463 that outputs the internal position information (A sin $θ_n$) to the first subtracter 421 of the sine signal processor 420, and a second internal position information converter 464 that outputs the internal position information (A cos $θ_n$) to the second subtracter 431 of the cosine signal processor 430.

The first internal position information converter 463 calculates a sine function value (A sin $θ_n$) applying the phase ($θ_n$) calculated by the integrator 461 as a parameter to obtain as the internal position information, corresponding to the sine wave signal (A sin θ) as the position information signal input from the encoder 120.

The second internal position information converter 464 calculates a cosine function value (A cos $θ_n$) applying the phase ($θ_n$) calculated by the integrator 461 as a parameter to obtain as the internal position information, corresponding to the cosine wave signal (A cos $θ_n$) as the position information signal input from the encoder 120.

In a case where the integrator 461 integrates the motor rotation angular speed ($ω_1$, $ω_2$) output from the position information signal processor 410 and calculates the rotation phase ($θ_n$) of the motor 110, the integrator 461 sequentially integrates even the latest motor rotation angular speed ($ω_1$, $ω_2$) output from the position information signal processor 410, and then calculates the motor rotation phase ($θ_1$) as the latest as presumable.

Accordingly, the first and second internal position information converters 463, 464 calculate the trigonometric function values (A sin $θ_n$, A cos $θ_n$) of the latest motor rotation phase ($θ_n$) calculated by the integrator 461, thereby obtaining the trigonometric function values (A sin $θ_n$, A cos $θ_n$) for the motor rotation phase ($θ_n$) as latest as presumable.

Figure 4:
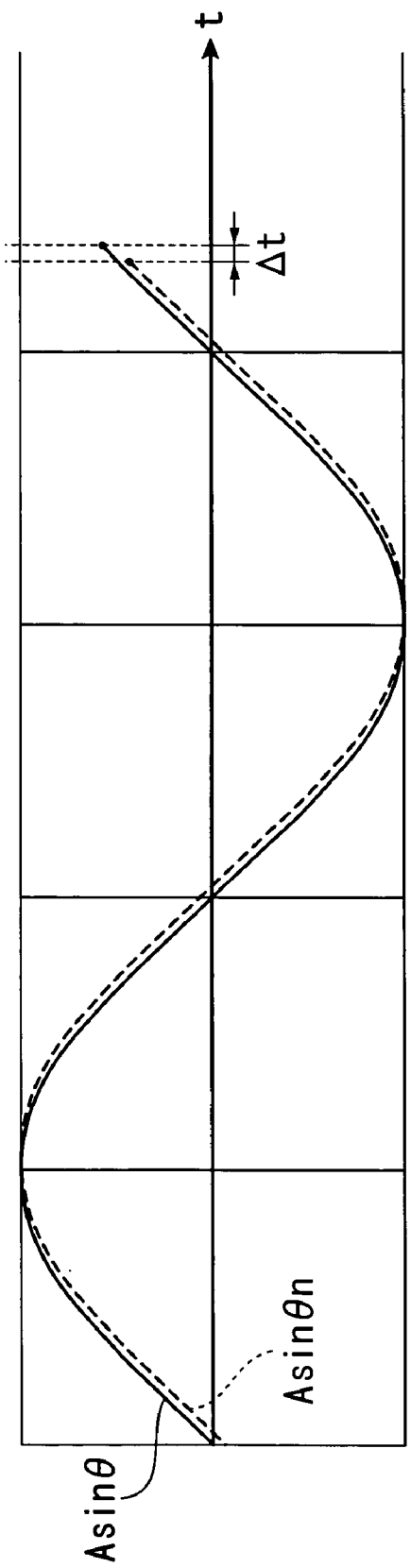
FIG. 4 is an illustration showing a relationship between a sine wave signal (A sin θ) input from the encoder and an internal position information (A sin $\theta_n$) generated by an internal position information generator.

FIG. 4 is an illustration showing the relationship between the sine wave signal (A sin θ) input from the encoder and the internal position information (A sin $θ_n$) generated by the internal position information generator.

The output unit 470 outputs the motor rotation angular speed which is the output signal selected by the switcher 452 to the CPU 310 (a central processing unit) via a filter 471. The filter 471 may be a low-pass filter.

And, the output unit 470 outputs the motor rotation phase ($\theta_n$) calculated by the integrator 461, as motor driving position information.

The CPU 310 (the central processing unit) compares the motor rotation angular speed from the speed calculator 400 with the target speed input from the outside, calculates a duty ratio of current (i) to be applied to the motor 110 so that the motor rotation angular speed ($\omega$) achieves the target speed, and performs PWM (pulse width modulation) control for the motor 110.

Now, operation of the servomechanism with such configuration will be described below.

When the motor 110 rotates, the encoder 120 detects the rotation of the motor 110 and outputs the two-phase signal (A sin $\theta$, A cos $\theta$) periodically changing in accordance with the rotation of the motor 110.

The two-phase signal (A sin $\theta$, A cos $\theta$) from the encoder 120 is input to the sine signal processor 420 and the cosine signal processor 430. In the following description, since the processing of the sine wave signal (A sin $\theta$) is similar to that of the cosine wave signal (A cos $\theta$), the processing of the sine wave signal (A sin $\theta$) is exemplified for explaining on the operation.

The first subtracter 421 compares the sine wave single (A sin $\theta$) input to the sine signal processor 420 with the internal position information (A sin $\theta_n$) generated by the first internal position information converter 463, and outputs the difference between them to the first gain multiplier 422.

The first gain multiplier 422 multiplies the difference signal from the first subtracter 421 by the predetermined gain (K), and outputs the motor rotation changing amount ($\Delta\theta_1$).

Then the first sign converter 441 multiplies the motor rotation changing amount ($\Delta\theta_1$) from the first gain multiplier 422 by +1 or −1 based on the sign of the cosine wave signal (A cos $\theta$) which is the other signal contained in the two-phase signal to convert the motor rotation changing amount ($\Delta\theta_1$) in the increasing direction, and generates the motor rotation angular speed ($\omega_1$).

Similarly, the motor rotation angular speed ($\omega_2$) is generated based on the cosine wave signal (A cos $\theta$) input to the cosine signal processor 430.

As the motor rotation angular speed ($\omega_1$) from the sine signal processor 420 and the motor rotation angular speed ($\omega_2$) from the cosine signal processor 430 are generated, the determiner 451 determines whether the sine wave (A sin $\theta$) is greater or smaller relative to the predetermined threshold 0.7 A, so that, based on the determination, the switcher 452 selects the motor rotation angular speed ($\omega_1$ or $\omega_2$) of the sine wave signal or that of the cosine wave signal having the region with the greater signal value change.

Then, the motor rotation angular speed ($\omega_n$) selected by the switcher 452 is split into two, the one being input to the integrator 461 so that the integrator 461 calculates the motor rotation phase ($\theta_n$), reflects the latest motor rotation angular speed ($\omega_n$) and updates the rotation phase ($\theta_n$) of the motor 110. The motor rotation phase ($\theta_n$) calculated by the integrator 461 is output to the first and second internal position information converters 463, 464 of the sine signal processor 420 and the cosine signal processor 430, so that the internal position information converter 462 generates the sine function value (A sin $\theta_n$) or the cosine function value (A cos $\theta_n$) applying the motor rotation phase ($\theta_n$) as a parameter.

And besides, the other one of the split motor rotation angular speed ($\omega_n$) is output from the output unit 470 to the CPU 310 via the filter 471.

The CPU 310 compares the motor rotation angular speed ($\omega_n$) from the speed calculator 400 with the target speed and calculates the duty ratio of the current (i) to be applied to the motor 110 so that the motor rotation angular speed ($\omega$) achieves the target value. The duty ratio allows the PWM (pulse width modulation) control to be performed on the motor 110, so that the motor 110 is rotated at the predetermined target speed.

According to the first embodiment with the above-described configuration, the following advantages can be attained.

(1) Since the internal position information generator 460 generates the position information (A sin $\theta_n$, A cos $\theta_n$) of the motor 110 constantly reflecting the latest motor speed information ($\omega_n$), the position information of the motor 110 as the latest as presumable can be obtained. Accordingly, the difference between the position information signal (A sin $\theta$, A cos $\theta$) from the encoder 120 and the internal position information (A sin $\theta_n$, A cos $\theta_n$) generated by the internal position information generator 460 becomes a derivative value of the position information signal (A sin $\theta$, A cos $\theta$) from the encoder 120, and is namely the driving speed ($\omega$) of the motor 110. Thus, when the position information signal (A sin $\theta$, A cos $\theta$) is input from the encoder 120, the difference of the both is instantly calculated to obtain the motor driving speed ($\omega$), thereby attaining a significant effect of remarkably recovering the time-lag in the conventional ways.

(2) The speed calculator 400 provides the motor driving speed ($\omega_n$) without the time-lag, the central processing unit (CPU) 310 controls the motor 110 with the application of the motor driving speed information ($\omega_n$) as the feedback signal, thereby providing extremely stable control system.

(3) Provision of the first and second internal position information converters 463, 464 that calculate the function value applying the phase as the parameter allows the position information signal input from the encoder 120 to be merely the sine wave signal, and need not be the phase information itself. Accordingly, the encoder 120 (a photoelectric encoder, a capacitance encoder, a magnetic encoder etc.), which is typically used as a sensor, can directly be used as the sensor, and therefore, there is no need of special design change just for the servomechanism 100 of the present embodiment, and cost increase can be avoided.

(4) Since the signal switching section 450 selects the phase changing amount (the driving speed information) calculated based on the signal having the signal value change being greater relative to the phase changing amount contained in the two-phase signal (A sin $\theta$, A cos $\theta$) from the encoder 120, the phase changing amount ($\omega$) can accurately be obtained as the motor speed information in the entire region. Additionally, the determination for the greater signal changing amount relative to the phase change does not require complicated arithmetical processing, but just requires simple comparison of the one signal value (the sine wave signal) with the threshold (0.7 A).

(5) Since the sign converter 440 is provided, the sign converter can convert the sign of the phase changing amount ($\Delta\theta$) in the increasing/decreasing direction in accordance with the rotation direction of the motor even if the phase changing amount is calculated as a minus value when the motor 110 is displaced in the plus direction, and obtain the driving speed (the phase changing amount ω) with the proper increasing/decreasing direction.

Second Embodiment

Next, a second embodiment of a servomechanism according to the present invention will be described with reference to FIG. 5.

The basic configuration of the second embodiment is the same as the first embodiment, except that a ratio of the two-phase signal output from the encoder 120 is utilized as an input signal.

Figure 5:
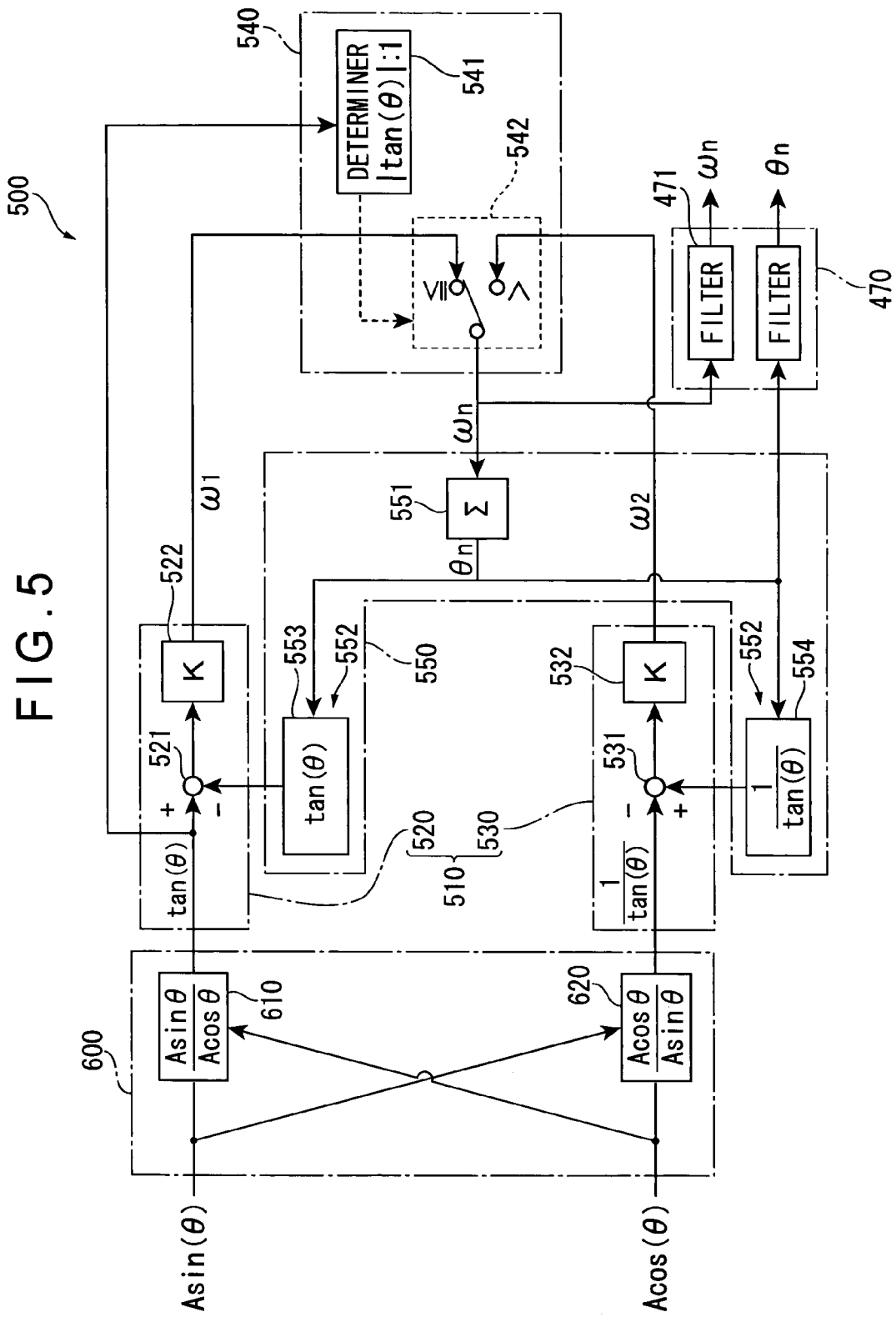
FIG. 5 is a block diagram showing the configuration of a speed calculator (a signal processing device) according to a second embodiment of the present invention.

FIG. 5 is a block diagram showing the configuration of a speed calculator (a signal processor) of the second embodiment.

In FIG. 5, a speed calculator 500 includes a sensor signal converter 600 that generates a two-phase signal (see FIG. 6) based on the ratio of the sine wave signal (A sin θ) and the cosine wave signal (A cos θ) contained in the two-phase signal from the encoder 120.

The sensor signal converter 600 includes a first signal converter 610 that calculates the A sin θ/A cos θ and outputs a tangent signal (tan θ) as a first signal, and a second signal converter 620 that calculates A cos θ/A sin θ and outputs a cotangent signal (1/tan θ) as a second signal.

A position information signal processor 510 includes a first signal processor 520 that processes the first signal (tan θ) and calculates a motor rotation angular speed, and a second signal processor 530 that processes the second signal (1/tan θ) and calculates a motor rotation angular speed.

In the first signal processor 520, a first subtracter 521 subtracts the internal position information generated by an internal position information generator 550 from the first signal (tan θ) to output a difference signal, and a first gain multiplier 522 multiplies the difference signal by a predetermined gain to output a motor rotation angular speed ($\omega_1$).

In the second signal processor 530, a second subtracter 531 subtracts the internal position information generated by the internal position information generator 550 from the second signal (1/tan θ) to output a difference signal, and a second gain multiplier 532 multiplies the difference signal by a predetermined gain to output a motor rotation angular speed ($\omega_2$).

In a signal switching section 540, a determiner 541 compares the first signal (tan θ) with 1 and determines whether the first signal is greater or smaller than 1, so that the signal switching section 540, according to the determination by the determiner 541, selects the motor rotation angular speed ($\omega_1$) based on the first signal when the first signal (tan θ) is or smaller than 1, and selects the motor rotation angular speed ($\omega_2$) based on the second signal when the first signal (tan θ) is greater than 1.

Figure 6:
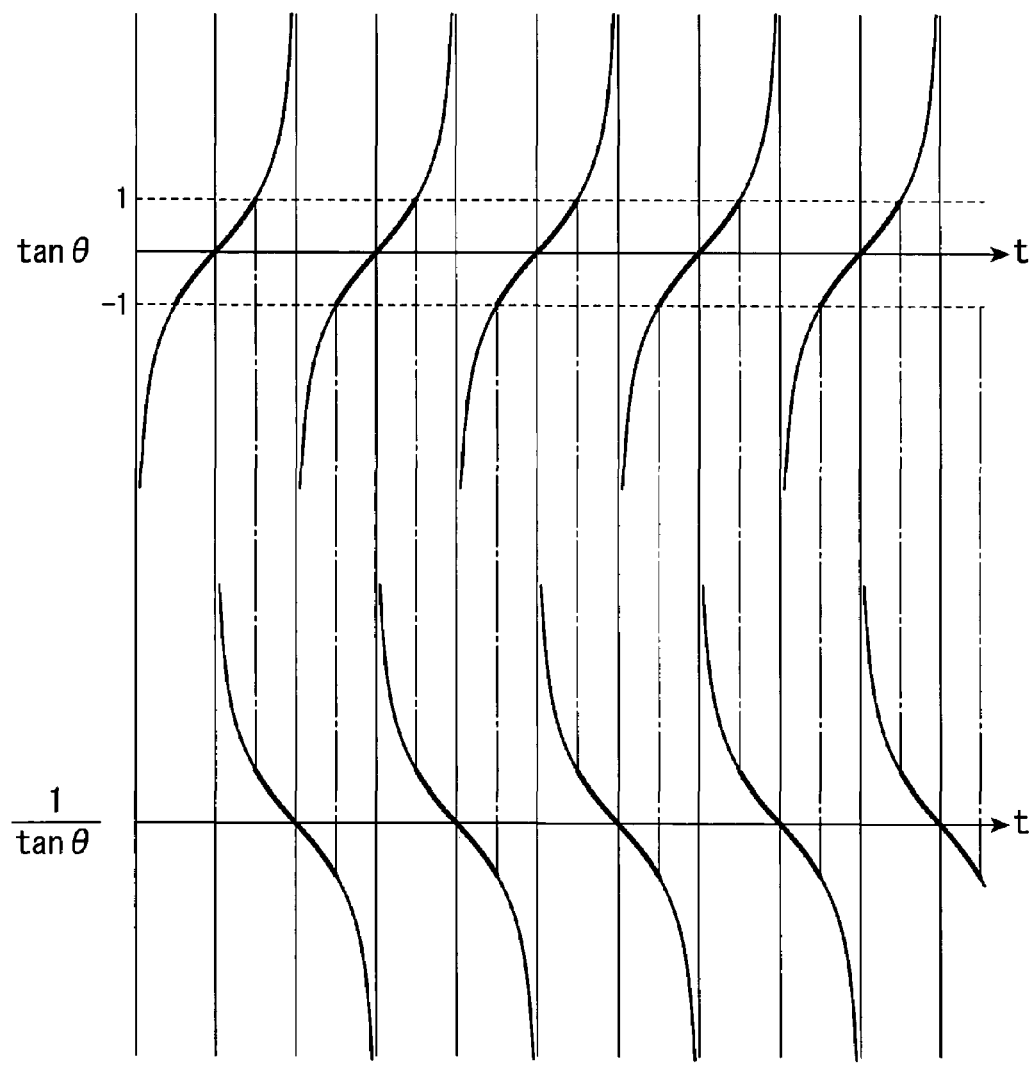
FIG. 6 is an illustration showing an example of a tangent signal (tan θ) and a cotangent signal (1/tan θ) generated based on a ratio of the two-phase signal from the encoder.

In other words, as shown in FIG. 6, since the first signal (tan θ) and the second signal (1/tan θ) have discontinuous regions, the continuous regions of the first signal (tan θ) and the second signal (1/tan θ) are utilized by switching them.

In the internal position information generator 550, an integrator 551 integrates the motor rotation angular speed ($\omega_1$, $\omega_2$) from the position information signal processor 510 to calculate the motor rotation phase ($\theta_n$), and the internal position information converter 552 converts the motor rotation phase ($\theta_n$) into a trigonometric function value applying the motor rotation phase ($\theta_n$) as a parameter.

The first internal position information converter 553 then calculates a tangent function value (tan $\theta_n$) applying the motor rotation phase ($\theta_n$) as the parameter and outputs it to the first subtracter 521.

And, the second internal position information converter 554 then calculates a tangent function value (1/tan $\theta_n$) applying the motor rotation phase ($\theta_n$) as the parameter and outputs it to the second subtracter 531.

Incidentally, while the sign converter 440 is provided in the first embodiment to convert the output signal from the first and second gain multipliers 422, 432 in the increasing direction corresponding to the motor rotation direction, in the second embodiment, since the first signal (tan θ) monotonically increases in a usable region (tan θ≦1) whereas the second signal (1/tan θ) monotonically decreases in a usable region (tan θ>1) as long as the motor 110 is displaced in the normal rotation direction, a motor rotation angular speed with the increasing/decreasing direction being constantly appropriate can be obtained if the direction of the subtraction is determined in advance, for instance, by subtracting the second signal (1/tan θ) from the internal position information with the second subtracter 531. Consequently, the second embodiment need not have the sign converter.

According to the second embodiment with the above-described configuration, the same advantage as the first embodiment can be attained.

Additionally, since the sensor signal converter 600 generates the two-phase signal (tan θ, 1/tan θ) based on the ratio of the sine wave signal (A sin θ) and the cosine wave signal (A cos θ) which are contained in the two-phase signal (A sin θ, A cos θ) from the encoder 120, the fluctuation of the amplitude A of the two-phase signal (A sin θ, A cos θ) from the encoder can be eliminated. Hence, the speed can be detected based on the stable position information signal (tan θ, 1/tan θ).

Third Embodiment

Next, a third embodiment of the present invention will be described below with reference to FIGS. 7 to 9.

The basic configuration of the third embodiment is the same as the first embodiment, except for the configuration of an internal position information generator in the third embodiment.

Figure 7:
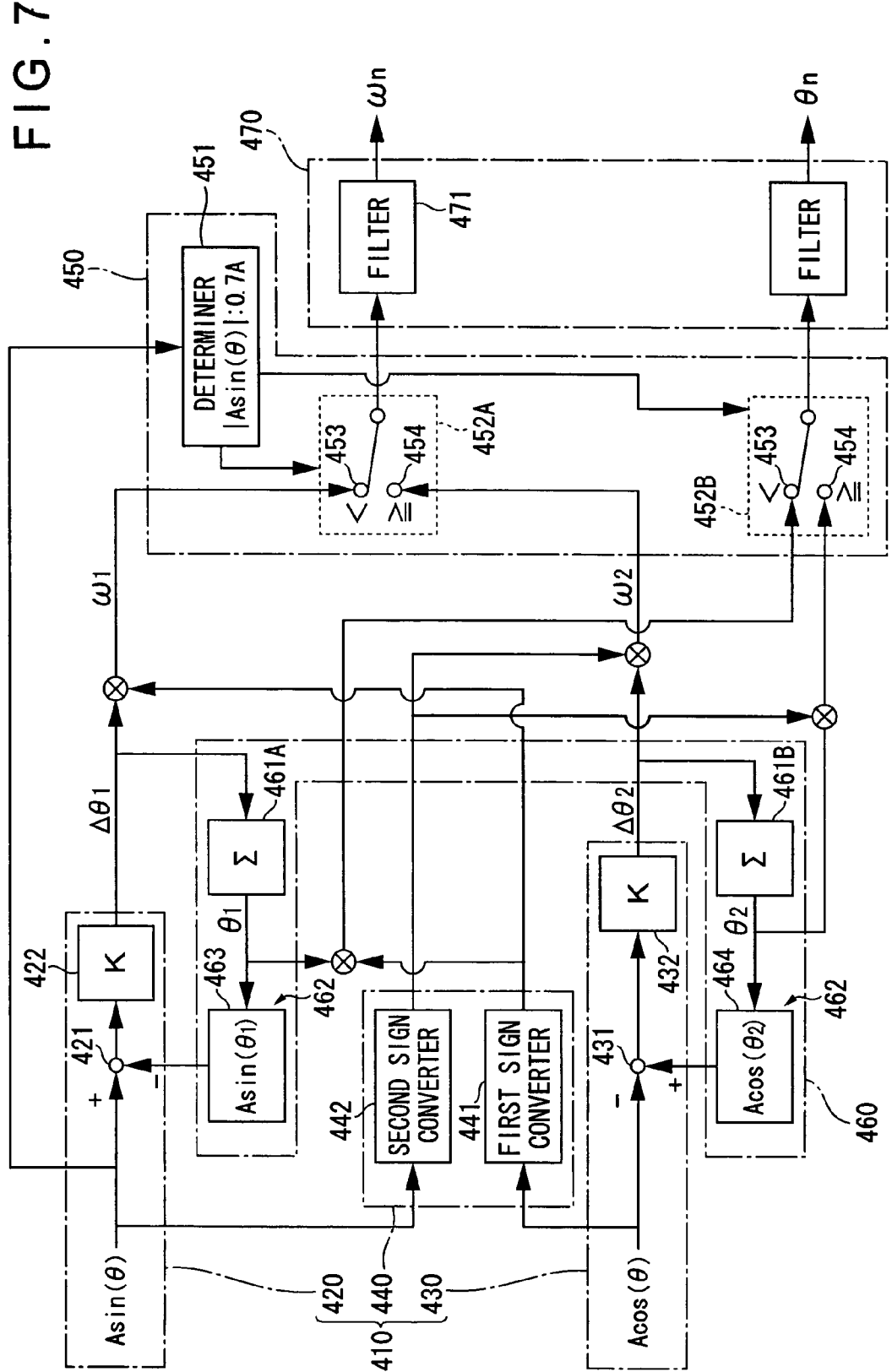
FIG. 7 is a block diagram showing the configuration of a speed calculator in a third embodiment.

FIG. 7 is a block diagram showing the configuration of a speed calculator in the third embodiment.

In FIG. 7, the internal position information generator 460 includes the first internal position information converter 463 for the sine signal processor 420, and includes the second internal position information converter 464 for the cosine signal processor 430, which is the same as the first embodiment.

Meanwhile, in the first embodiment (FIG. 3), the provision of the integrator 461 was one. When the sine signal processor 420 and the cosine signal processor 430 respectively output the motor rotation angular speeds ($\omega_1$, $\omega_2$), the signal switching section 450 selects and inputs the one of motor rotation angular speeds ($\omega_1$ or $\omega_2$) to the integrator 461, and the integrator 461 integrated the motor rotation angular speed ($\omega_1$ or $\omega_2$) to calculate the motor rotation phase. The motor rotation phase ($\theta_n$) calculated by the integrator 461 is output to the first internal position information converter 463 and the second internal position information converter 464, so that these internal position information converters respectively calculate the two pieces of internal position information (A sin $\theta_n$, A cos $\theta_n$).

On the other hand, a first integrator 461A and a second integrator 461B are provided in the third embodiment. To be more specific, as shown in FIG. 7, there are provided the first integrator 461A that integrates a motor rotation changing amount ($\Delta\theta_1$) output from the sine signal processor 420 based on the sine wave signal to calculate the motor rotation phase ($\theta_1$) based on the sine wave signal, and the second integrator 461B that integrates a motor rotation changing amount ($\Delta\theta_2$) output from the cosine signal processor 430 based on the cosine wave signal to calculate a motor rotation phase ($\theta_2$) based on the cosine wave signal.

The first integrator 461A integrates the rotation changing amount ($\Delta\theta_1$) of the motor 110 output from the first gain multiplier 422 and calculates the motor rotation phase ($\theta_1$). Then the first integrator 461A outputs the calculated motor rotation phase ($\theta_1$) to the first internal position information converter 463.

The second integrator 461B integrates the rotation changing amount ($\Delta\theta_2$) of the motor 110 output from the second gain multiplier 432 and calculates the motor rotation phase ($\theta_2$). Then the second integrator 461B outputs the calculated motor rotation phase ($\theta_2$) to the second internal position information converter 464.

While the signal switching section 450 includes the determiner 451 and the switcher 452, so that the switcher 452 switches between the sine terminal 453 and the cosine terminal 454 with the switching unit in the same manner as the first embodiment, the switcher of the third embodiment includes a first switcher 452A for outputting speed information and a second switcher 452B for outputting position information.

The configuration of the first switcher 452A is the same as the switcher described in the first embodiment, the first switcher 452A switching between the sine terminal 453 and the cosine terminal 454 based on the determination of the determiner 451 and outputting the motor rotation angular speed $\omega_n$. The motor rotation angular speed $\omega_n$ ($\omega_1$ or $\omega_2$) is output to the CPU 310 (the central processing unit) via the filter 471.

Although the output signal $\omega_n$ (the motor rotation angular speed $\omega_1$, $\omega_2$) from the switcher 452 is input to the integrator 461 in the first embodiment, in the third embodiment, the output signal con from the first switcher 452A is not input to the integrators (461A, 461B).

The second switcher 452B switches between the sine terminal 453 and the cosine terminal 454 based on the determination of the determiner 451 with the switching unit.

Here, the signal in which the sign of the motor rotation phase ($\theta_1$) calculated by the first integrator 461A is converted by the first sign converter 441 is input to the sine terminal 453. And, the signal in which the sign of the motor rotation phase ($\theta_2$) calculated by the second integrator 461B is converted by the second sign converter 442 is input to the cosine terminal 454. The output from the second switcher 452B is output as the position information $\theta_n$ ($\theta_1$ or $\theta_2$) via a filter.

According to the third embodiment with the above-described configuration, the following advantage can be attained in addition to the advantage of the first embodiment.

In a case where the two-phase signal containing the sine wave signal and the cosine wave signal is output from the encoder 12, the speed calculator 400 of the third embodiment includes the first integrator 461A and the first internal position information converter 463 corresponding to the sine signal processor 420 for processing the sine wave signal, and includes the second integrator 461B and the second internal position information converter 464 corresponding to the cosine signal processor 430 for processing the cosine wave signal. Accordingly, the motor rotation angular speed $\omega_1$ based on the sine wave signal can be calculated with the arithmetic processing merely based on the sine wave signal in the loop of the first integrator 461A and the first internal position information converter 463 applying the motor rotation changing amount $\Delta\theta_1$ based on the sine wave signal as the feedback information. Similarly, the motor rotation angular speed $\omega_2$ based on the cosine wave signal can be calculated with the arithmetic processing merely based on the cosine wave signal in the loop of the second integrator 461B and the second internal position information converter 464 applying the motor rotation changing amount $\Delta\theta_2$ based on the cosine wave signal as the feedback information.

For instance, as in the first embodiment, the signal switching section 450 may switch between the motor rotation angular speeds ($\omega_1$, $\omega_2$) respectively output from the sine signal processor 420 and the cosine signal processor 430 to input to the integrator 461, so that the integrator 461 calculates the rotation phase ($\theta_n$) of the motor.

However, when the amplitude of the sine wave is different from that of the cosine wave, the both being output from the encoder 120, there is generated the difference between the motor rotation angular speed $\omega_1$ from the sine signal processor 420 and the motor rotation angular speed $\omega_2$ from the cosine signal processor 430. In other words, the first subtracter 421 of the sine signal processor 420 and the second subtracter 431 of the cosine signal processor 430 respectively calculate A(sin $\theta$-sin $\theta_1$) and A'(cos $\theta$-cos $\theta_2$) and then calculate the motor rotation angular speeds $\omega_1$, $\omega_2$ based on the difference. Consequently, the motor rotation angular speeds $\omega_1$, $\omega_2$ appear different since the amplitudes (A, A') of the sine wave and the cosine wave are different. Additionally, since the signal switching section 450 selects the motor rotation angular speed ($\omega_1$ or $\omega_2$) based on the signal having the greater function value relative to the phase change of either the sine wave signal or the cosine wave signal, the difference between the amplitudes of the sine wave signal and the cosine wave signal is likely apparent. If such different motor rotation angular speeds $\omega_1$, $\omega_2$ are switched and integrated with the integrator 461, the integration of the phase when switching may result in a significant error.

Figure 8:
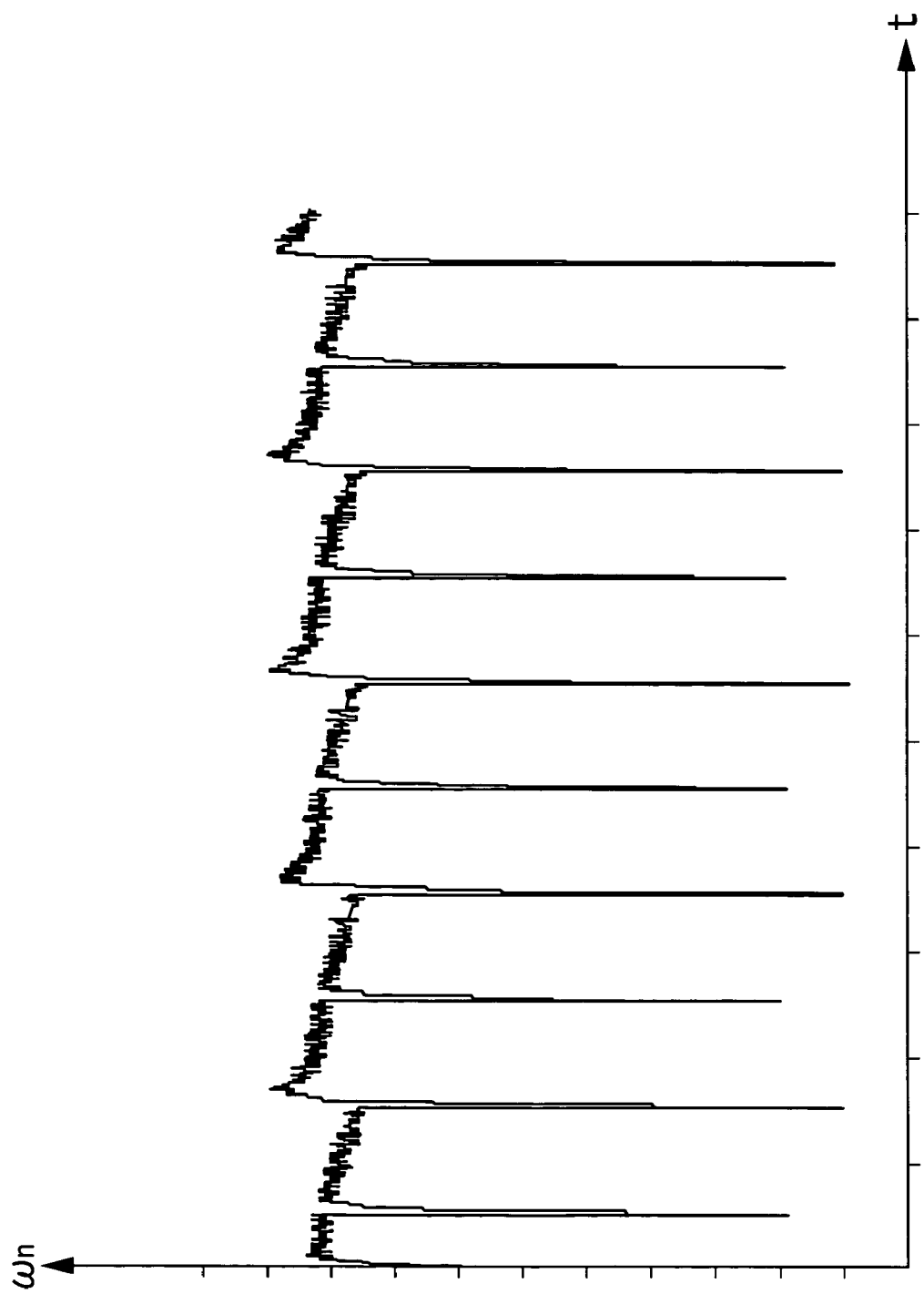
FIG. 8 is an illustration showing an example of a motor rotation angular speed ω that is output when amplitude of the sine wave signal is different from that of the cosine wave signal by 5% in the configuration of the first embodiment.

For example, FIG. 8 is an example of a motor rotation angular speed $\omega$ output when the amplitude of the sine wave signal A sin $\theta$ is different from that of the cosine wave signal A' cos $\theta$ by 5%. As shown in FIG. 8, there is a significant error in the switching timing of the signal.

On the other hand, in the third embodiment, the internal position information for the sine wave signal is calculated by the first integrator 461A and the first internal position information converter 463 based on the motor rotation changing amount $\Delta\theta_1$ calculated by the sine signal processor 420 whereas the internal position information for the cosine wave signal is calculated by the second integrator 461B and the second internal position information converter 464 based on the motor rotation changing amount $\Delta\theta_2$ calculated by the cosine signal processor 430. Accordingly, the motor rotation angular speeds $\omega_1$, $\omega_2$ respectively output from the position information processors (the sine signal processor 420, the cosine signal processor 430) will not be influenced by the amplitude difference between the sine wave signal and the cosine wave signal.

Figure 9:
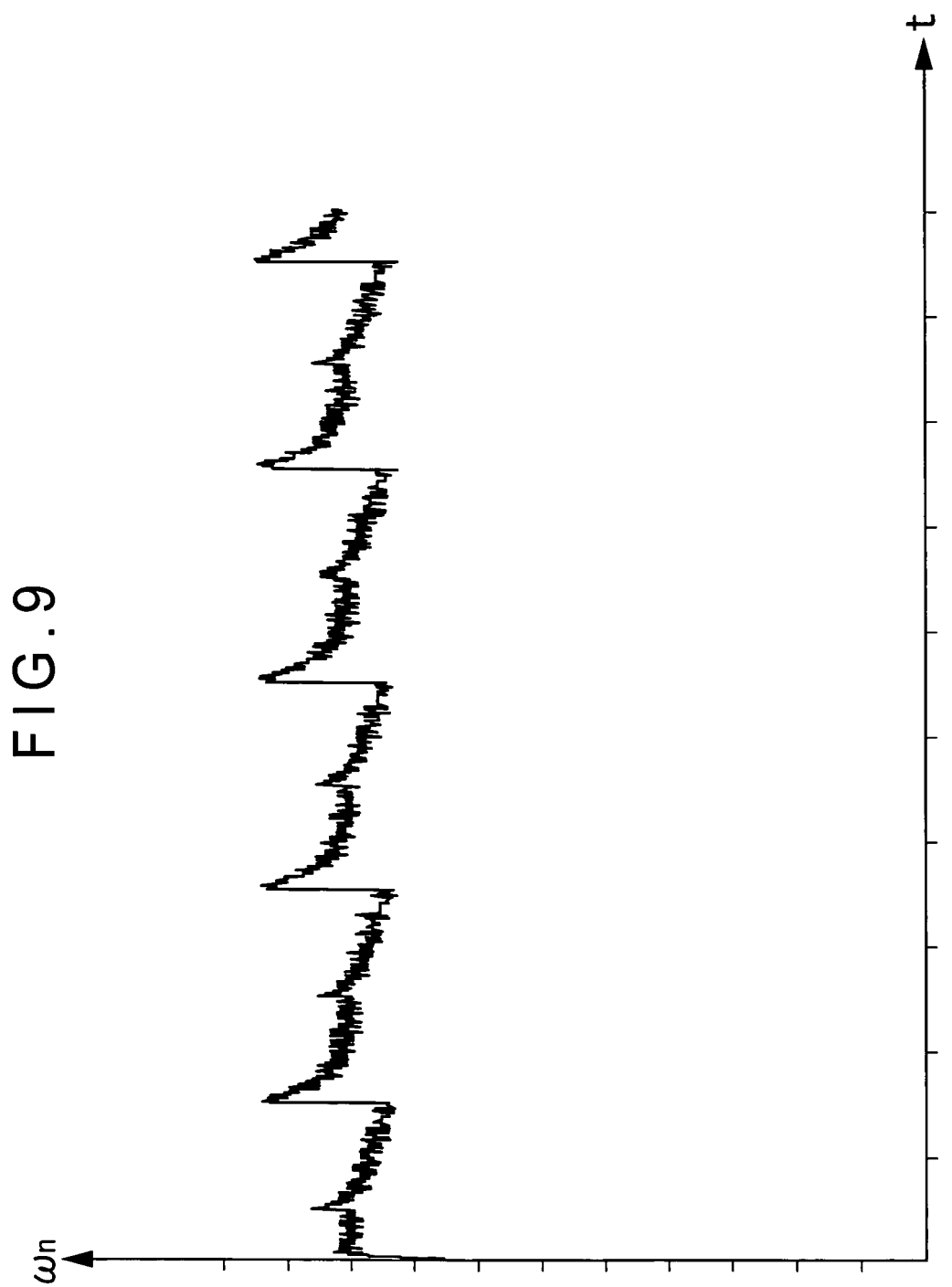
FIG. 9 is an illustration showing an example of a motor rotation angular speed ω that is output when amplitude of the sine wave signal is different from that of the cosine wave signal by 5% in the configuration of the third embodiment.

For example, FIG. 9 is an example of a motor rotation angular speed $\omega$ output when the amplitude of the sine wave signal A sin $\theta$ is different from that of the cosine wave signal A' cos $\theta$ by 5% in the configuration of the third embodiment. As shown in FIG. 9, according to the third embodiment, the influence of the difference between the amplitude of the sine wave signal and that of the cosine wave signal is restricted as compared with the first embodiment (FIG. 8), so that the motor rotation angular speed ω relatively smoothly continues.

Fourth Embodiment

Next, a fourth embodiment of the present invention will be described below with reference to FIG. 10.

The basic structure of the fourth embodiment is the same as the first embodiment, except that the motor rotation speed is obtained based on a digital signal in which the signal from the encoder 120 is converted with an A/D converter are provided in the fourth embodiment.

Figure 10:
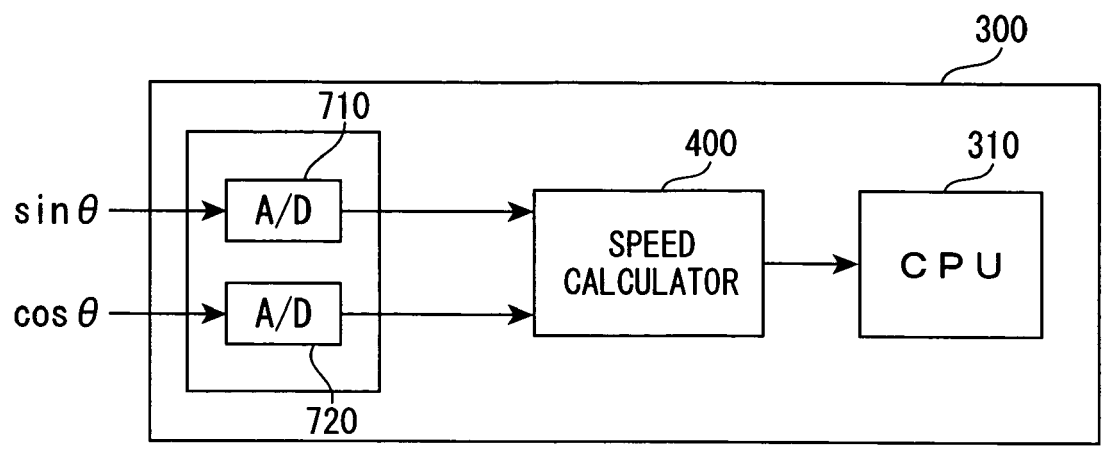
FIG. 10 is a block diagram showing the configuration of a fourth embodiment.

To be more specific, in FIG. 10, a first A/D converter 710 that performs A/D conversion on the sine wave signal from the encoder 120, and a second A/D converter 720 that performs A/D conversion on the cosine wave signal from the encoder 120.

The speed calculator (the signal processor) 400 includes the functions of the position information signal processor, the signal switching section, the internal position information generator etc., but these functions are achieved by a predetermined signal-processing program.

Note that the present invention is not limited to the above-described embodiments, and modifications, improvements etc. are included in the present invention as long as the object of the present invention can be achieved.

Figure 11:
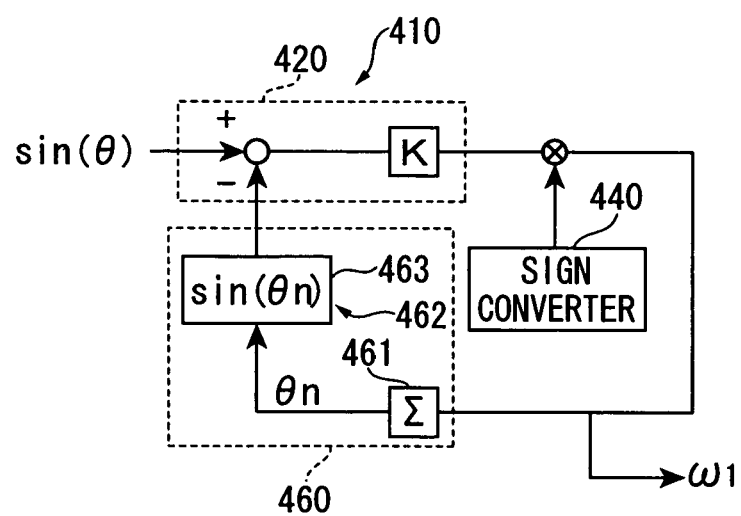
FIG. 11 is a block diagram showing a modification of the present invention.
Figure 12:
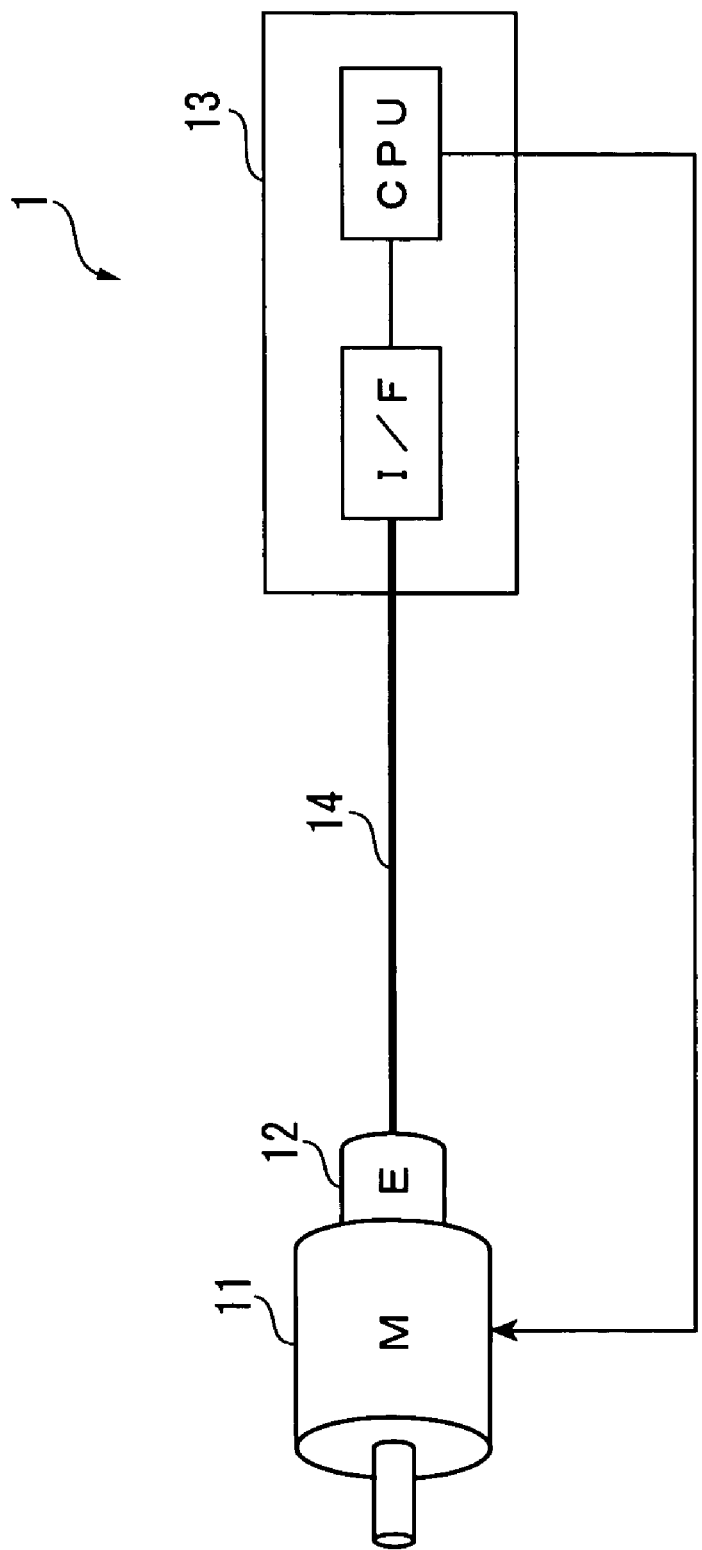
FIG. 12 is a block diagram showing the configuration of a conventional servomechanism.

For example, although the sine signal processor 420 and the cosine signal processor 430 respectively processing the two-phase signal (A sin θ, A cos θ) output from the encoder 120 are provided, and the output signal from the sine signal processor 420 and the output signal from the cosine signal processor 430 are switched in the first embodiment, as shown in FIG. 11, the position information signal processor 410 may only include the sine signal processor 420 for processing the sine wave signal (A sin θ) to output the motor rotation speed ($\omega_1$) just based on the sine wave signal (A sin θ). Incidentally, since the sine wave signal (A sin θ) increases/decreases periodically, the sign converter 440 is required for converting the sign of the phase changing amount of the motor 110 in accordance with the rotation direction of the motor 110.

Although the object to be controlled is the motor 110 having the rotator, and the speed calculator (the signal processor) 400 calculates the rotation speed (the rotation phase) of the motor 110 based on the two-phase signal from the encoder 120, the driving body is not limited to the motor having the rotator, and may be a linear motor or the like. Particularly in the control of the linear motor, since the time-lag largely influences the control performance, the driving speed is calculated promptly by the signal processing device (the speed calculator) of the present invention, so that the speed is controlled based on the calculated driving speed, thus stably controlling the speed without the time-lag.

The priority applications No. JP2004-371725 and No. JP2005-155918 upon which this patent application is based are hereby incorporated by reference.

What is claimed is:

1. A signal processing device for processing a position information signal output from a sensor in accordance with a driving position of a driver and detecting a driving speed of the driver, comprising:
   a position information signal processor that processes the position information signal and calculates driving speed information of the driver; and
   an internal position information generator that reflects a latest driving speed information calculated by the position information signal processor and generates a latest presumed position of the driver as internal position information, wherein
   the position information signal output from the sensor is a periodic function signal periodically changing in accordance with drive of the driver, the periodic function signal being a two-phase signal containing a first signal and a second signal having a predetermined phase difference
   the position information signal processor includes:
      a first signal processor that processes the first signal and outputs a phase changing amount of the first signal as the driving speed information, and
      a second signal processor that processes the second signal and outputs a phase changing amount of the second signal as the driving speed information:
   the signal processing device further comprises a signal switching section that is provided on a downstream side of the position information signal processor, the signal switching section selecting and switching to the output signal based on the periodic function signal with the signal value changing amount of the periodic function signal being greater than the phase changing amount of either the output signal from the first signal processor or the output signal from the second signal processor;
   the internal position information generator includes:
      an integrator that integrates the phase changing amount from the position information signal processor and calculates a phase corresponding to position information of the driver, and
      an internal position information converter that calculates a periodic function value corresponding to the phase calculated by the integrator as the internal position information; and
   the position information signal processor calculates the driving speed information of the driver based on a difference between the position information signal from the sensor and the internal position information, generated by the internal position information generator.

2. The signal processing device according to claim 1, wherein
   the position information signal processor includes:
   a difference calculator that calculates the difference between the position information signal from the sensor and the internal position information generated by the internal position information generator; and
   a driving speed calculator that calculates driving speed information of the driver based on the difference from the difference calculator.

3. The signal processing device according to claim 1, wherein
   the periodic function signal is a sine wave signal, and
   the signal switching section includes:
   a determiner that compares the first signal or the second signal with a predetermined threshold and determines whether the signal is greater than the predetermined threshold; and
   a switcher that switches between the output signal from the first signal processor and the output signal from the second signal processor according to the determination result of the determiner.

4. The signal processing device according to claim 1, wherein the position information signal processor further includes a sign converter that converts a sign of the phase changing amount output from each of the first and second signal processors into a sign indicating increase/decrease in a moving direction of the driver.

5. The signal processing device according to claim 1, wherein
the internal position information generator includes:
a first integrator that integrates the phase changing amount of the first signal output from the first signal processor and calculates a phase corresponding to position information of the driver;
a first internal position information converter that calculates a function value of the first signal based on the phase calculated by the first integrator;
a second integrator that integrates the phase changing amount of the second signal output from the second signal processor and calculates a phase corresponding to position information of the driver; and
a second internal position information converter that calculates a function value of the second signal based on the phase calculated by the second integrator.

6. The signal processing device according to claim 1, wherein
the driver is a motor having a rotator, and the position information signal output from the sensor is a periodic function signal periodically changing in accordance with rotation of the motor,
the position information signal processor outputs a rotation angular speed as driving speed information of the motor,
the integrator integrates the rotation angular speed from the position information signal processor and calculates a rotation phase angle of the motor, and
the internal position, information converter calculates a periodic function value based on the rotation phase angle of the motor.

* * * * *